(12) United States Patent
Handt et al.

(10) Patent No.: US 12,377,375 B2
(45) Date of Patent: Aug. 5, 2025

(54) DISTRIBUTOR ASSEMBLY, IN PARTICULAR FOR A SEPARATION UNIT OF A MODULAR PROCESS DEVICE ARRANGEMENT

(71) Applicant: Sartorius Stedim Biotech GmbH, Goettingen (DE)

(72) Inventors: Sebastian Handt, Goettingen (DE); Florian Mieth, Goettingen (DE); Heino Heise, Goettingen (DE)

(73) Assignee: SARTORIUS STEDIM BIOTECH GMBH (DE)

( * ) Notice: Subject to any disclaimer, the term of this patent is extended or adjusted under 35 U.S.C. 154(b) by 227 days.

(21) Appl. No.: 18/030,759

(22) PCT Filed: Sep. 27, 2021

(86) PCT No.: PCT/EP2021/076504
§ 371 (c)(1),
(2) Date: Apr. 6, 2023

(87) PCT Pub. No.: WO2022/073788
PCT Pub. Date: Apr. 14, 2022

(65) Prior Publication Data
US 2023/0372845 A1   Nov. 23, 2023

(30) Foreign Application Priority Data
Oct. 8, 2020   (EP) .................................... 20200822

(51) Int. Cl.
*B01D 35/30*   (2006.01)
*B01D 15/10*   (2006.01)
(Continued)

(52) U.S. Cl.
CPC ........... *B01D 35/306* (2013.01); *B01D 15/10* (2013.01); *B01D 65/00* (2013.01); *F16L 55/11* (2013.01);
(Continued)

(58) Field of Classification Search
CPC ..................................................... F16L 37/144
See application file for complete search history.

(56) References Cited

U.S. PATENT DOCUMENTS 3,538,940 A * 11/1970 Graham .................. F16K 27/00
285/305
3,563,265 A   2/1971 Graham
(Continued)

FOREIGN PATENT DOCUMENTS

DE   1775715 A1   4/1972
DE   3313539 A1   10/1984
(Continued)

*Primary Examiner* — Eric Keasel
(74) *Attorney, Agent, or Firm* — Dilworth IP, LLC

(57) ABSTRACT

A distributor assembly, which is provided in particular for a separation unit of a modular process device arrangement, including a fluid distributor device having a plurality of fluid ports, wherein the fluid distributor device can selectively establish and block fluid communications between the fluid ports. The distributor assembly further includes a connecting element and a retaining element. The connecting element is adapted to be attached to one of the fluid ports, and the distributor assembly includes an associated mounting slot at the fluid port. The mounting slot is adapted to the shape of the retaining element such that the retaining element can be inserted into the mounting slot up to a defined retaining position, in which the retaining element engages the connecting element and fixes it in place.

16 Claims, 5 Drawing Sheets

(51) Int. Cl.
   *B01D 65/00* (2006.01)
   *F16L 55/11* (2006.01)
(52) U.S. Cl.
   CPC .... *B01D 2313/105* (2013.01); *B01D 2313/13* (2013.01); *B01D 2313/54* (2013.01)

(56) References Cited

U.S. PATENT DOCUMENTS

| | | |
|---|---|---|
| 3,945,925 A | 3/1976 | Nicholson, Jr. |
| 5,614,091 A | 3/1997 | Janik et al. |
| 6,231,089 B1 | 5/2001 | Decler et al. |
| 6,926,826 B2 | 8/2005 | Reid |
| 7,981,289 B2 | 7/2011 | Tadlock |
| 7,984,929 B2 * | 7/2011 | Gill .................. A61M 39/10 |
| | | 604/905 |
| 9,650,768 B2 * | 5/2017 | Johnson .............. E03C 1/0408 |
| 10,422,459 B2 * | 9/2019 | Jones .................. F16L 37/144 |
| 11,325,056 B2 | 5/2022 | Olschok et al. |
| 2003/0217958 A1 | 11/2003 | Reid |
| 2012/0325351 A1 | 12/2012 | Volker |
| 2015/0108050 A1 | 4/2015 | Maggiore et al. |
| 2021/0260498 A1 | 8/2021 | Olschok et al. |

FOREIGN PATENT DOCUMENTS

| | | |
|---|---|---|
| DE | 19833381 A1 | 1/2000 |
| DE | 60310691 T2 | 12/2007 |
| DE | 102010009816 A1 | 9/2011 |
| DE | 102018004096 A1 | 11/2019 |
| EP | 0462971 B1 | 8/1994 |
| EP | 0715112 A2 | 6/1996 |
| EP | 1520612 A1 | 4/2005 |
| EP | 1051226 B1 | 12/2007 |
| EP | 1898139 A2 | 3/2008 |
| EP | 1651901 B1 | 9/2008 |
| EP | 1644656 B1 | 8/2010 |
| WO | 2014014765 A1 | 1/2014 |
| WO | 2016057794 A1 | 4/2016 |
| WO | 2019066793 A1 | 4/2019 |

* cited by examiner

DISTRIBUTOR ASSEMBLY, IN PARTICULAR FOR A SEPARATION UNIT OF A MODULAR PROCESS DEVICE ARRANGEMENT

FIELD OF THE INVENTION

The invention relates to a distributor assembly, in particular for a separation unit of a modular process device arrangement, which is provided for carrying out one or more unit operations in a bioprocess engineering process.

BACKGROUND

In the field of purification (downstream process), separation units such as filter capsules, chromatography columns or membrane adsorbers are employed. Currently, such separation units and, where required, further functional units (sensors, pumps, mixers, etc.) are firmly interconnected by means of hoses and/or piping in order to be able to carry out a particular process step.

Such a conventional process arrangement requires a lot of space and is very unwieldy, also because many components of the arrangement need to be fixed in place. In addition, such an arrangement includes large dead spaces, which, for one thing, harbors the risk of undesirable backmixing and, for another, is opposed to a desired maximum product yield. This is of particular significance in the production of high-quality biopharmaceutical active substances. A further drawback of a conventional process arrangement is that prior to carrying out further separation steps in the downstream process, the medium to be purified has to be intermediately stored each time in a cumbersome manner, e.g. in a separate tank or in bags, since there is currently a lack of compatibility between the interfaces of these intermediate steps (susceptible to pressure, no sterile barrier, no suitable connections, etc.).

Many of these drawbacks are caused by the expansive and inflexible, i.e. not readily changeable or adjustable, fluid connections of the separation units. In addition, special measures are often required to secure such fluid connections, which makes the effort involved in setting up a process device arrangement and its handling even more difficult.

Special coupling devices for establishing and separating fluid connections are known in which a retaining element is made use of, for example from EP 462 971 B1, EP 1 644 656 B1, EP 1 651 901 B1, WO 2016/057794 A1 and U.S. Pat. No. 6,231,089 B1. U.S. Pat. No. 7,981,289 B2 shows a fluid treatment device of a modular structure, having individual modules the head sections of which include fluid lines and associated fluid ports. The fluid ports of neighboring modules may be connected to each other by means of connectors.

SUMMARY

It is the object of the invention to improve and simplify the fluid connections of separation units and other functional units within a process device arrangement.

This object is achieved by a distributor assembly having the features of claim 1. Advantageous and expedient configurations of the distributor assembly according to the invention are indicated in the dependent claims.

The distributor assembly according to the invention is provided in particular for a separation unit of a modular process device arrangement and includes a fluid distributor device having a plurality of fluid ports, the fluid distributor device being adapted to selectively establish and block fluid communications between the fluid ports. The distributor assembly further includes a connecting element and a retaining element. The connecting element is adapted to be attached to one of the fluid ports, and the distributor assembly includes an associated mounting slot at the fluid port. The mounting slot is adapted to the shape of the retaining element such that the retaining element is insertable into the mounting slot up to a defined retaining position, in which the retaining element engages the connecting element and fixes it in place.

The invention is based on the finding that a simple, modular structure of a process device arrangement can be achieved with the aid of suitable distributor assemblies having standardized connection options. To this end, the distributor assembly according to the invention includes, in addition to a fluid distributor device that allows flexible interconnection of separation units and other functional units, a special connection technology that allows both a fluid communication and a rigid mechanical connection to be established with a neighboring distributor assembly or a functional unit.

The distributor assembly according to the invention distinguishes itself in that the devices required for connection, in particular the retaining element, the mounting slot and the section of the respective connecting element that is matched to the retaining element, are simple to manufacture. The effort involved in assembling these parts to produce a secure, stable connection is extremely low.

For the purposes of the present invention, the term "connecting element" comprises all components which can be connected directly to one of the fluid ports of the distributor assembly and fixed in place with the aid of the retaining element that can be inserted into the mounting slot.

In particular, the connecting element may be a connector. Such a connector has a flow duct which is defined by a wall and opens into two opposite open ends. In the fixed state of the connector, one open end of the connector is aligned with the fluid port of the distributor assembly. The connector is fixed at this end by means of the retaining element. The other end of the connector may be fixed in place on a neighboring distributor assembly in the same way, so that in addition to a rigid mechanical connection, a short, reliable fluid communication is also established. It should be especially emphasized in this context that the wall of the connector can be designed to be very pressure-resistant. Elaborate additional measures would be required to achieve a comparable safety standard with a conventional hose connection.

In addition to a connector, a functional unit which, in the fixed state, is in fluid communication with the fluid port, may also be provided as the connecting element. Such a functional unit should not be understood here to mean a connector, a further distributor assembly or a separation unit. Rather, it refers to a different functional unit that serves a different purpose within the framework of carrying out or controlling a process. Such a functional unit may be, e.g., a venting means, a sampling equipment, a sensor (in particular for measuring pressure, flow, viscosity, pH or electrical conductivity) or a spectroscopic measuring device (UV-VIS, NIR, Raman, etc.). This means that, owing to the invention, such functional units can be directly connected to a fluid port of a distributor assembly and can thus be regarded as a component of the distributor assembly.

In accordance with a further development of the invention, such a functional unit may also be integrated in a blind plug.

A connecting element attached to one of the fluid ports may also include a septum to provide access for a cannula at a particular point in time. This access can be used to withdraw liquid, e.g., with a syringe (for sampling, for example) or to supply liquid. The septum may also be integrated in a blind plug.

Irrespective of how the connecting element is configured otherwise, that end or those ends which is/are to be connected to the fluid port of the distributor assembly should be of a universal design, i.e. these ends should be equally configured such that each of them can be fixed in place by means of the retaining element. According to a preferred configuration, it is provided that in the fixed state of the connecting element, the retaining element engages by an engagement section in a recess of the connecting element. Accordingly, this recess should be substantially the same for all connecting elements.

In some cases, it is desirable or necessary for proper functioning that a functional unit is locked against rotation after assembly. For example, in the case of a venting means, it has to be made sure that the air can escape upwards.

According to a first variant, this can be achieved in that the engagement section of the retaining element and the recess of the connecting element are matched to each other such that the connecting element can be fixed in place by the retaining element only in one single orientation or in a limited number of defined orientations. For example, a square basic shape of the engagement section and of the recess ensures that the connecting element can be fixed in place in only one of four possible orientations and cannot be rotated thereafter. A triangular basic shape allows three orientations, etc.

According to a second variant, one or more preferred orientations of the connecting element can also be achieved in that a flange of the connecting element and an opening associated with a fluid port are matched to each other such that the connecting element is insertable into the opening only in a single orientation or in a limited number of defined orientations.

In order to prevent the retaining element that is used to fix the connecting element in place from falling out of the mounting slot, a preferred embodiment provides that the retaining element includes a detent element that, in the retaining position of the retaining element, cooperates with a matching detent section in or on the mounting slot of the distributor assembly. Preferably, the detent element and/or the detent section is/are elastically deflectable. Basically, this principle can also be reversed, i.e. the detent element may be provided in or on the mounting slot and the detent section may be provided on the retaining element.

This type of retaining or locking may be provided in two functionally different variant embodiments. In order to preclude or make noticeable any subsequent manipulation after a connecting element has been connected, provision is made according to the first variant embodiment that the detent element is no longer detachable from the detent section when the retaining element is in the retaining position. Removal of the connecting element is then only possible by forcibly damaging the retaining element or the housing of the distributor assembly. Such a non-detachable fixing is advisable for a specified and already pre-assembled setup in order to rule out errors on the part of the user.

However, if the user is to be permitted to remove an already mounted connecting element again, provision is made according to the second variant embodiment that the detent element and the detent section are matched to each other such that the retaining element is removable from the retaining position by deflecting the detent element or the detent section, if required with the aid of a tool. Such a releasable fixing is intended for users who, e.g., wish to implement their own test setups.

In order to avoid errors during insertion of the retaining element at all events, in a preferred embodiment the retaining element and the distributor assembly, in particular the mounting slot, have complementary index structures that cooperate with each other such that insertion of the retaining element into the mounting slot in an incorrect orientation is prevented. This safety measure is reasonable, for example, if the retaining element has a detent element on one side that might not snap into the retaining position in case of an incorrect orientation of the retaining element in the mounting slot.

The complementary index structures may include at least one raised portion, for example one or more rails, and at least one depression adapted to the raised portion. This allows a mechanical coding to be provided in a simple manner based on the poka-yoke principle.

With a view to effective protection against leakage, the connecting element is preferably sealed from the fluid port by at least two sealing rings.

BRIEF DESCRIPTION OF THE DRAWINGS

Further features and advantages of the invention will be apparent from the description below and from the accompanying drawings, to which reference is made and in which.

DETAILED DESCRIPTION

Figure 1:
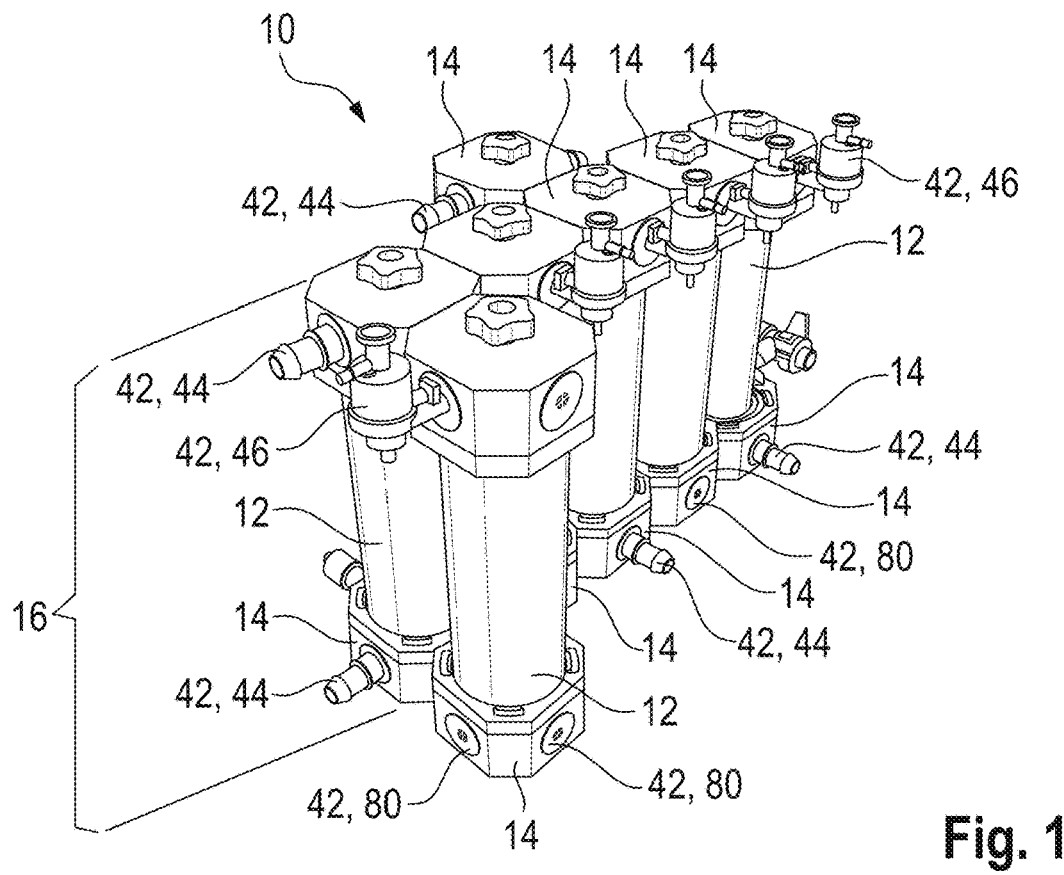
FIG. 1 shows a process device arrangement for carrying out one or more unit operations in a bioprocess engineering process including a plurality of separation units and distributor assemblies.
Figure 2:
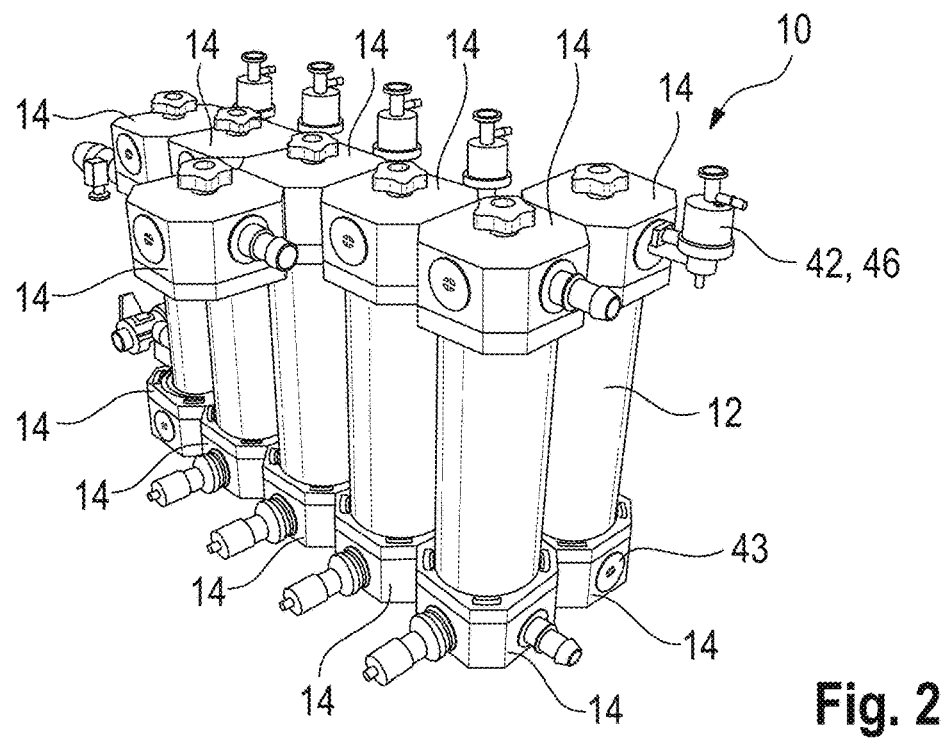
FIG. 2 shows a different view of the process device arrangement shown in FIG. 1.

FIGS. 1 and 2 illustrate, by way of example, a process device arrangement for performing one or more unit operations in a bioprocess engineering process. The process device arrangement 10 comprises a plurality of separation units 12, which may differ in terms of separation technology (e.g. filter capsule, chromatography column, membrane adsorber) and/or filter material and/or design and/or overall size and/or other parameters.

The separation units 12 are interconnected among one another with the aid of special distributor assemblies 14, which can also be referred to as distributor caps, in particular in the application shown by way of example in FIGS. 1 and 2. The process device arrangement 10 thus comprises a plurality of subunits (modules) 16, which are formed of a separation unit 12 and one or two distributor assemblies 14, which are attached to one or both face sides of the separation units 12. The distributor assemblies 14 are each firmly connected to at least one neighboring distributor assembly 14, so that a rigid composite of distributor assemblies 14 is formed.

In the exemplary embodiment illustrated, all of the distributor assemblies 14 feature the same basic structure, and each distributor assembly 14 is associated with, and firmly attached to, a separation unit 12, so that the overall result is a compact and stable process device arrangement 10 having separation units 12 arranged in a defined manner, in particular in a grid pattern.

Figure 3:
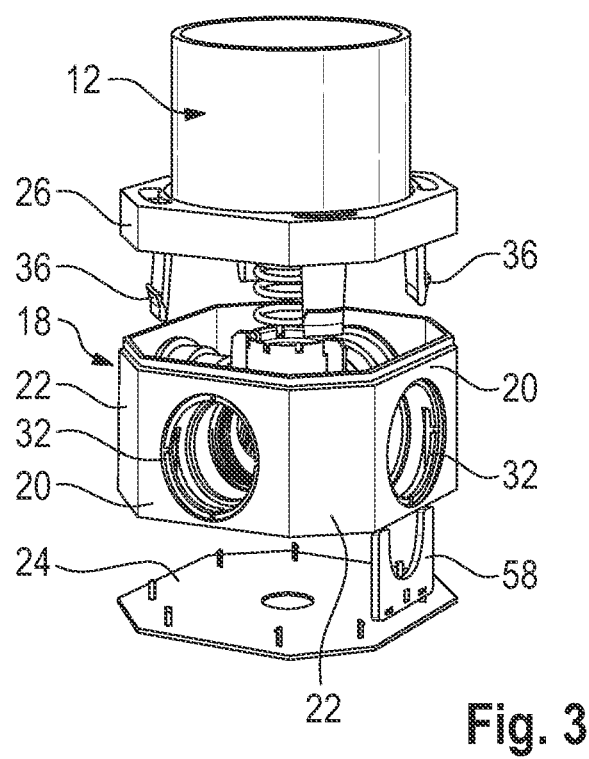
FIG. 3 shows an exploded view of a distributor assembly according to the invention, without connecting elements.
Figure 4:
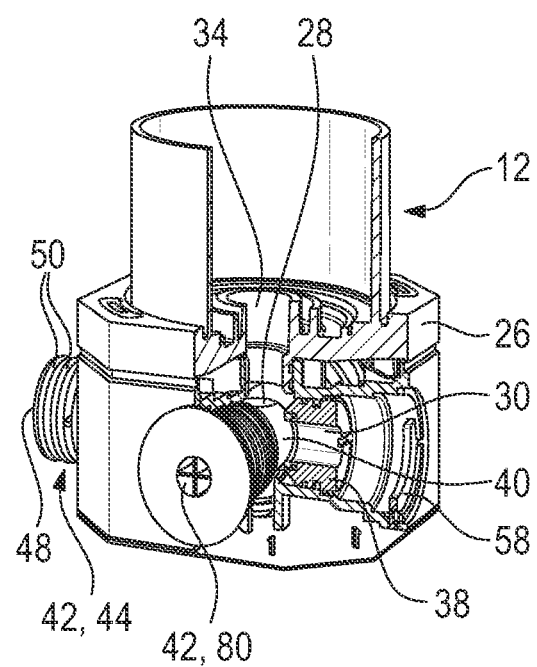
FIG. 4 shows a partially sectioned view of the distributor assembly of FIG. 3 with connecting elements inserted.

The basic structure of the distributor assemblies 14 is apparent from FIGS. 3 and 4. The distributor assembly 14 includes a housing 18 which is essentially in the shape of a straight prism the base and top surfaces of which are in turn essentially in the shape of an equiangular polygon, in this case an octagon. Four main side walls 20, oriented at right angles to each other, are connected to each other by intermediate secondary side walls 22. On one face side the housing 18 is closed by a cover 24; on the other face side the housing 18 is open and is covered by a bottom or cover section 26 (depending on whether the distributor assembly 14 is placed on the bottom or the top of the separation unit 12 in relation to the operating position of the separation unit 12) of the associated separation unit 12, which is not fully shown in FIGS. 3 and 4.

Inside the housing 18 there is a fluid distributor device having a central working port 28 accessible through the open side of the housing and a plurality of lateral supply or discharge ports 30. The supply or discharge ports 30 of the fluid distributor device are positioned in a plane that is oriented perpendicular to the axial direction of the working port 28. In the fluid distributor device shown here, four supply or discharge ports 30 are provided, which are arranged at angular distances of 90 degrees and are accessible through respective openings 32 in the main side walls 20 of the housing 18.

The distributor assembly 14 further comprises connecting means which are used for establishing a fluid communication between a fluid inlet or outlet 34 of the separation unit 12 and the working port 28 of the fluid distributor device when the distributor assembly 14 is placed onto the bottom or cover section 26 of the separation unit 12. The distributor assembly 14 is fixed in place on the bottom or cover section 26 of the separation unit 12 with the aid of mounting means 36 (detent elements or the like). The bottom or cover sections 26 of all of the separation units 12 are matched to the connecting means and mounting means 36 of the distributor assembly 14, which are arranged and configured in a standardized fashion.

Figure 7:
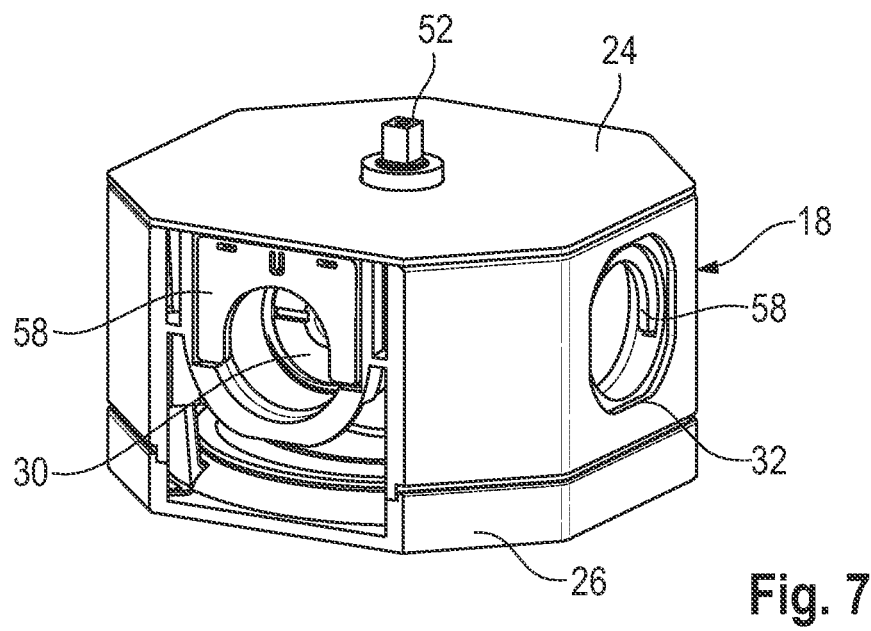
FIG. 7 shows a distributor assembly with retaining elements inserted, without connectors.

In this embodiment, the fluid distributor device is essentially formed by a multi-port valve, more precisely by a ball valve, which provides the aforesaid fluid ports and can assume different switching positions. An essential component of this valve is a ball 40 with drilled holes, which is sealed by means of a sealing ring on each supply or discharge port side and is held in position by a support element 38. The ball 40 can be rotated to at least two different switching positions by means of a spindle 52 (see FIG. 7) or the like.

Particular connecting elements 42 may be attached to one or more of the supply or discharge ports 30 of the fluid distributor device of a distributor assembly 14. Such connecting elements 42 may be connectors 44 that establish a fluid communication to a neighboring distributor assembly 14 or to other components, such as a hose line. Connecting elements 42 may, however, also be certain functional units. Such functional units are not to be understood here as further distributor assemblies 14 or separation units 12, but rather as special components that provide or allow additional functionality, such as the venting means 46 shown in FIGS. 1 and 2.

In the following, first the connecting of two neighboring distributor assemblies 14 by means of a connector 44 is described, which establishes, on the one hand, a fluid communication and, on the other hand, a rigid mechanical connection between the neighboring distributor assemblies 14.

Figure 5:
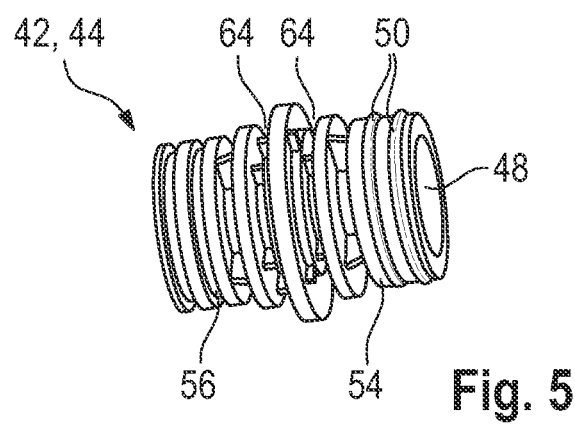
FIG. 5 shows a connector according to a first embodiment.

In FIG. 5, a first embodiment of a connector 44 is shown separately. Here, the connector 44 is configured as a double coupling (double male connector). A continuous flow duct 48 is formed in the interior of the connector 44. The wall surrounding the flow duct 48 is sufficiently thick and strong to withstand high pressures (4 bar and possibly more). Inside the housings 18 of the distributor assemblies 14, the connector 44 is sealed by two respective O-rings 50.

In the assembled state, a first open end 54 of the connector 44 is aligned with one of the supply or discharge ports 30 of the fluid distributor device of the distributor assembly 14. The connector 44 protrudes from the opening 32 of the associated main side wall 20 of the housing 18 and extends through the opening 32 of the opposite main side wall 20 of the housing 18 of the neighboring distributor assembly 14. The second open end 56 of the connector 44 is aligned with the associated supply or discharge port 30 of the fluid distributor device of the neighboring distributor assembly 14.

Figure 6:
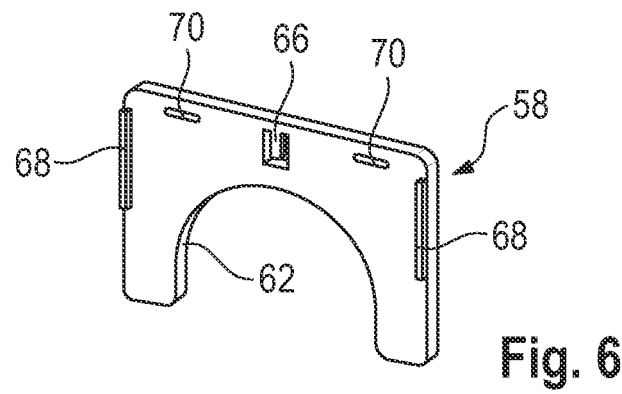
FIG. 6 shows a retaining element.

The connector 44 is fixed in place in each of the two neighboring distributor assemblies 14 with the aid of a universal retaining element 58, which is provided for insertion into a mounting slot 60, which will be discussed in more detail below. A retaining element 58 is illustrated separately in FIG. 6 and in an assembled state in a distributor assembly 14 (without a connector) in FIG. 7.

The retaining element 58 is essentially in the shape of a rectangular plate having an essentially semi-circular cutout. The edge surface of this cutout constitutes an engagement section 62 which is matched to a recess 64 in the outer contour of the connecting element 42, in this case the connector 44.

On a first side, the retaining element 58 includes an elastically deflectable detent element 66 in the form of a tongue or a hook. On the second, opposite side, two elongated raised portions 68 are formed, which may also be referred to as mounting rails. With respect to the engagement section 62, the raised portions 68 are formed on the two neighboring lateral edges and extend largely parallel. In addition, two indentations 70 are also provided on the second side at the end facing away from the engagement section 62.

Figure 8:
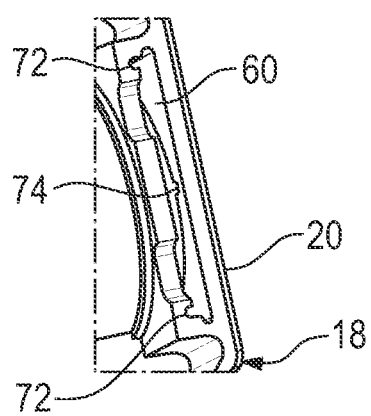
FIG. 8 shows a mounting slot of a distributor assembly.
Figure 9:
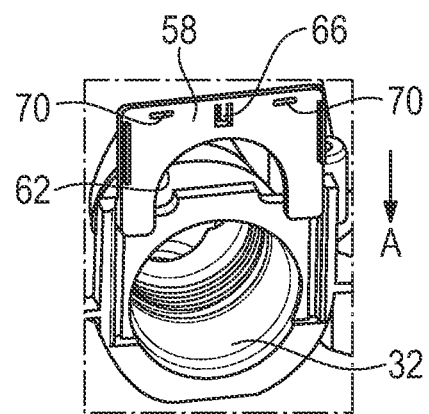
FIG. 9 shows a sectional front view of the mounting slot with the retaining element partly inserted.
Figure 10:
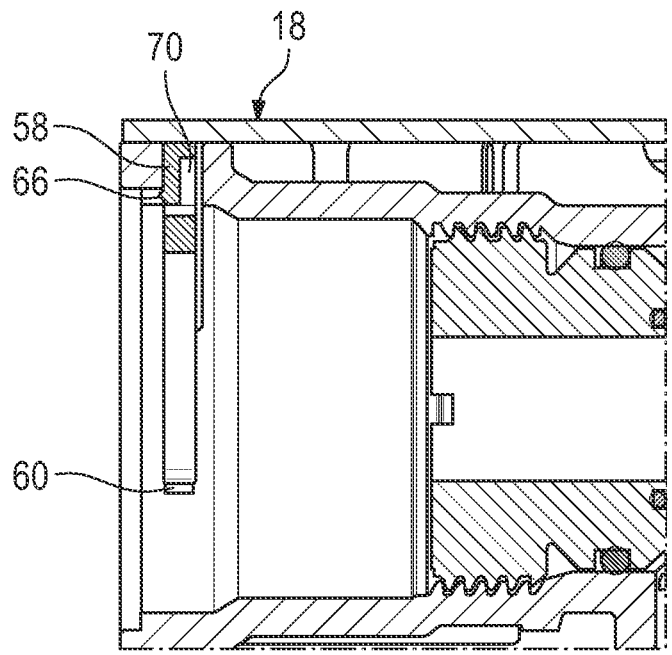
FIG. 10 shows a sectional side view of the mounting slot with the retaining element fully inserted.

FIGS. 8 to 10 show the mounting slot 60 in greater detail, into which the retaining element 58 can be inserted. The mounting slot 60 is formed in the housing 18 of the distributor assembly 14 and is freely accessible. The mounting slot 60 is arranged at a supply or discharge port 30 so as to intersect the inwardly protruding opening 32 which is associated with the supply or discharge port 30.

The shape of the mounting slot 60 is adapted to the shape of the retaining element 58. In particular, the mounting slot 60 includes a main channel that corresponds to the plate shape of the retaining element 58. Moreover, on a first side, the mounting slot 60 includes two depressions 72 that are complementary to the raised portions 68. On the opposite side of the mounting slot 60, a detent section 74 in the form of a breakout is provided, which has a detent surface and is matched to the detent element 66.

Owing to the special design of the retaining element 58 with the raised portions 68 and of the mounting slot 60 with the depressions 72 forming complementary index structures, the retaining element 58 can be inserted into the mounting slot 60 only in one orientation in which the raised portions 68 engage in the depressions 72.

In order to additionally exclude that the retaining element 58 can be inserted in an orientation in which the engagement section 62 is not aligned with the opening 32, it may be provided that the mounting slot 60 becomes somewhat narrower at the bottom—in relation to the insertion direction A (see FIG. 9)—toward the center of the opening 32. Accordingly, the width of the retaining element 58 also decreases toward the end at which the engagement section 62 is formed. This prevents the retaining element 58 from being inadvertently inserted into the mounting slot 60 with its wider end first.

In terms of manufacturing engineering, it is advantageous if the retaining element 58 becomes thinner toward the bottom—likewise based on the insertion direction A—i.e. the two sections next to the cutout (which is semicircular here) each converge in a wedge shape. This wedge shape also turns out to be advantageous in that it assists a correct axial positioning of the connecting element 42. For example, if the connecting element has not been inserted quite completely into the opening 32 and therefore the recess 64 is not perfectly aligned with the mounting slot 60, the retaining element 58 can nevertheless engage in the recess 64 thanks to its wedge shape and, as it is further pushed into the mounting slot 60, automatically pulls the connecting element 42 into the housing 18 until it has reached the correct axial position.

In the desired, correct orientation, the retaining element 58 can be pushed into the mounting slot 60 until the detent element 66, which is deflected transversely to the insertion direction A during insertion, can snap back into the breakout and support itself against the detent section 74. This position of the retaining element 58 will be hereinafter referred to as the retaining position.

The interaction between the detent element 66 and the detent section 74 may also be effected in the reverse manner. Thus, instead of a deflectable tongue or a deflectable hook, a non-deflectable protrusion may be formed on the retaining element 58, for example in the form of a hemisphere. In this case, at least that section of the main side wall 20 which provides the detent section 74 is then elastically deflectable. When the retaining element 58 is inserted into the mounting slot 60, the detent element 66 pushes the section of the main side wall 20 outwards until that section can snap back into the retaining position and the detent element 66 can support itself on the detent section 74.

In the retaining position, the retaining element 58 interacts with the connector 44 previously inserted into the opening 32. More specifically, the engagement section 62 of the retaining element 58 engages with the recess 64 in the outer contour of the connector 44. Since the recess 64 is bounded on both sides in the axial direction of the connector 44, the connector 44 is fixed in a defined position on the housing 18 of the distributor assembly 14.

Figure 11A:
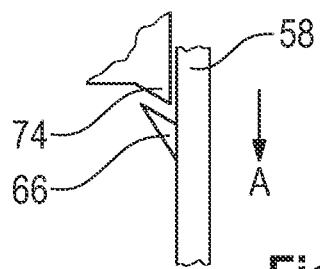
FIG. 11a shows a symbolic representation of a non-releasably inserted retaining element.

In the event that a later removal of the retaining element 58 and the connector 44 is not desired, the formations of the detent element 66 and the detent section 74 are selected such that the detent element 66 irreversibly hooks onto the detent section 74. In particular, this can be achieved by a detent section 74 formed as an undercut and having an inclined detent surface and a detent element 66 matched thereto, as is illustrated by way of example in the symbolic drawing in FIG. 11a. The retaining element 58 and the connector 44 are then irreversibly fixed and cannot be removed from the housing 18 of the distributor assembly 14 free of damage.

Figure 11B:
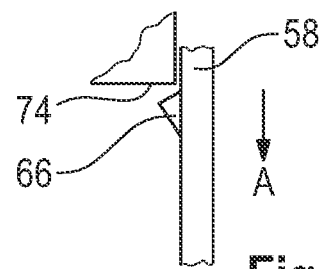
FIG. 11b shows a symbolic representation of a releasably inserted retaining element.

If, however, a later removal of the retaining element 58 and the connector 44 is intended to be permitted, a reversible cooperation of the detent element 66 with the detent section 74 is provided. This can be achieved, for example, by formations of the detent element 66 and the detent section 64 as are shown in the symbolic drawing in FIG. 11b. In this case, it is possible to deflect the detent element 66 in the transverse direction again to such an extent that it can be guided past the detent section 74 during pulling out against the insertion direction A. The deflection of the detent element 66 can be achieved using a suitable tool which engages in one or both of the indentations 70, so that the retaining element 58 can be levered out. For this reason, the indentations 70 are formed in an area of the retaining element 58 that protrudes from the mounting slot 60. Otherwise, the main channel of the mounting slot 60 may be widened at least in sections to allow access for the tool.

Alternatively or additionally, it may be provided that the retaining element 58 has a decreasing wall thickness. More specifically, the wall thickness of the retaining element 58—when correctly oriented in relation to the mounting slot 60—decreases in the insertion direction A, i.e. when inserted vertically top down, the retaining element 58 is thinner at the bottom than at the top. Such a design of the retaining element 58 improves the implementation of the mounting slot 60 in the housing 18 by injection molding.

The second end 56 of the connector 44, which protrudes from the opening 32 of the distributor assembly, is fixed in place on the housing 18 of the neighboring distributor assembly 14 in the same way as described above. As a result, the two distributor assemblies 14 are rigidly connected to each other.

A different distributor assembly 14 may be connected to each of the supply and discharge ports 30 of a distributor assembly 14. The lengths of the connectors 44 are preferably dimensioned such that the distributor assemblies 14 that are connected to each other are very close to or in contact with each other. The above described reduction in the wall thickness of the retaining elements 58 allows the housings 18 of the interconnected distributor assemblies 14 to be contracted and pressed or braced against each other.

The geometric configuration of the distributor assemblies 14 specifies a logical grid with defined locations at which distributor assemblies 14 can be arranged for connection to neighboring distributor assemblies 14.

As already mentioned, the supply or discharge ports 30 of the distributor assemblies 14 may also be made use of to connect certain functional units. Such functional units, just like the connector 44 described above, have a first end 54 that can be inserted into the opening 32 of a distributor assembly 32. The flow duct 48 formed in this first end 54 establishes fluid communication with the associated supply or discharge port 30 of the distributor assembly 14.

The functional unit is fixed in place at the housing of the distributor assembly 14 in the same manner as described above in connection with the connector 44. That is, the first end 54 of the functional unit is provided with a recess 64 in which the engagement section 62 of the retaining element 58 engages when the latter is transferred to the retaining position.

Examples of functional units that can be fixed in place on the housing 18 of the distributor assembly 14 include venting means 46, sampling equipment, sensors (in particular for measuring pressure, flow, viscosity, pH or electrical conductivity) and spectroscopic measuring devices (UV-VIS, NIR, Raman, etc.).

Figure 12:
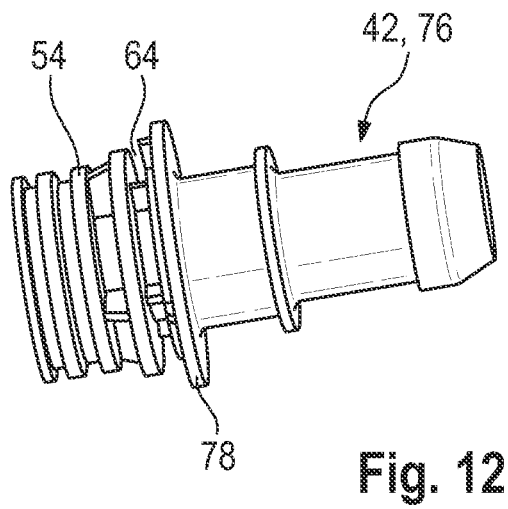
FIG. 12 shows a hose barb.
Figure 13:
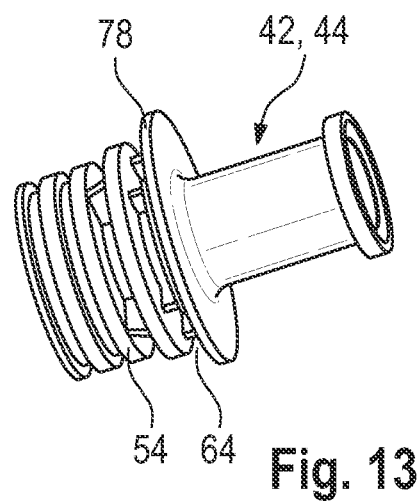
FIG. 13 shows a connector according to a second embodiment.

A functional unit may also be connected to a supply or discharge port 30 of a distributor assembly 14 by means of a flexible hose line, for example with the aid of a hose barb 76 as shown in FIG. 12.

FIGS. 13 to 16 show further examples of types of connectors 44 that can be fixed in place in a housing 18 of a distributor assembly 14 at least by one end 54 as described above.

In certain embodiments, a mechanical coding or anti-rotation device is provided that ensures that the connecting element 42 can be inserted into the opening 32 of a distributor assembly 14 and fixed in place only in a single orientation or in a limited number of defined orientations.

Figure 14:
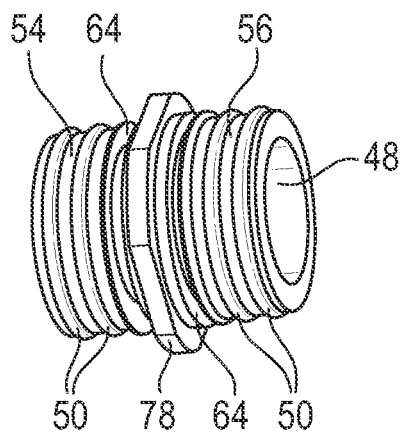
FIG. 14 shows a connector according to a fourth embodiment.
Figure 15:
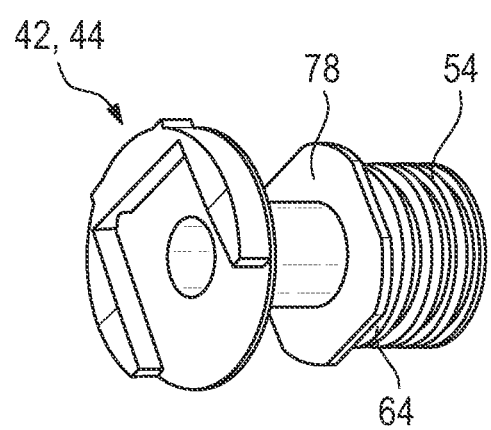
FIG. 15 shows a connector according to a fifth embodiment.
Figure 16:
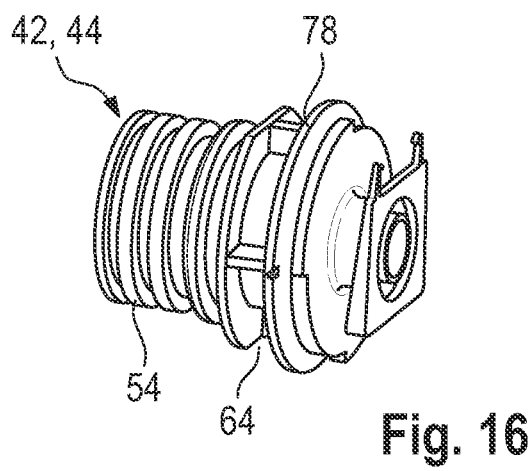
FIG. 16 shows a connector according to a sixth embodiment.

According to a first alternative, to this end, it is provided that the edge of the opening 32 is not round and the connector 44, or generally the connecting element 42, includes a flange 78 having a matching outer circumference. For example, as shown in FIGS. 14 to 16, the flange 78 may have the shape of a polygon, and the corners may be rounded. In order that such a connecting element 42 can be fixed to a supply or discharge port 30 of a distributor assembly 14, the associated opening 32 needs to have a shape corresponding to the polygon. For example, the opening 32 shown in FIG. 7 has a square basic shape, to which the flange 78 of the connector 44 shown in FIG. 15 is matched.

Depending on the specific shape of the opening 32 and the flange 78, the connecting element 42 can be inserted and fixed in place only in a single orientation or in a plurality of defined (not arbitrary) orientations.

According to a second alternative, it is basically also possible to shape the recess 64 of a connecting element 42 so as to allow the retaining element 58 to be transferred to the retaining position only when the connecting element 42 assumes a very specific orientation or one of a limited number of defined orientations. This can be achieved, e.g., by an oval basic shape of the bottom of the recess 64, which allows a first orientation and an orientation rotated by 180 degrees about the longitudinal axis. Furthermore, many other mutually matching formations of the recess 64 of the connecting element 42 and of the engagement section 62 of the retaining element 58 are possible, which permit only one or only a limited number of defined orientations of the connecting element 42. For example, with a square basic shape of the bottom of the recess 64 and with a correspondingly square-shaped engagement section 62 of the retaining element 58, four orientations of the connecting element 42 with a rotational angle distance of 90 degrees are possible.

Such codings or anti-rotation devices are expedient in particular if a functional unit, such as a venting means 46, is intended to have a particular orientation in the operating state.

Figure 17:
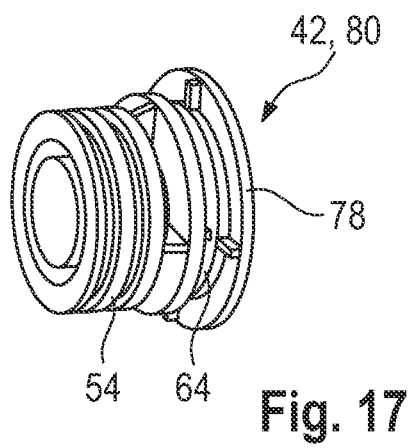
FIG. 17 shows a blind plug.

Any unused supply or discharge ports 30 may be sealed with a blind plug 80 as shown in FIG. 17. Like any other connecting element 42, the blind plug 80 is also sealed off by two O-rings 50 from the housing 18 in which it is arranged, and fixed in place by a retaining element 58. Basically, it is also possible to integrate a functional unit into a blind plug 80.

As shown in FIG. 2, a septum 43 which closes the respective, otherwise unused supply or discharge port 30 may also be provided as a connecting element 42. This offers the possibility of providing access for a cannula at this location, in order to be able to withdraw or supply a liquid, e.g. using a syringe. The septum may also be integrated in a blind plug 80.

Irrespective of the final configuration of the process device arrangement 10 constructed by means of the distributor assemblies 14, all distributor assemblies 14 and at least all separation units 12 and other components (functional units, hose lines, etc.) that are directly attached to the distributor assemblies 14 are configured as disposable components, i.e. they are intended for single use and are accordingly formed from suitable plastic materials. Insofar as the individual components permit, the entire process device arrangement 10, or at least a large part of it, may be pre-sterilized before being put into operation, so that it is immediately ready for use.

The distributor assemblies 14 as described above on the basis of several examples, may be used in the biopharmaceutical industry, in particular for carrying out one or more process steps in a downstream process. However, the invention is not limited to such an application. Among others, use in bind/elute and flow-through processes is possible in the context of membrane and chromatography applications.

LIST OF REFERENCE NUMBERS 10 process device arrangement
12 separation unit
14 distributor assembly
16 subunit
18 housing
20 main side wall
22 secondary side wall
24 cover
26 bottom or cover section
28 working port
30 supply or discharge port
32 opening
34 fluid inlet or outlet
36 mounting means
38 support element
40 ball
42 connecting element
44 connector
46 venting means
48 flow duct
50 O-ring
52 spindle
54 first end of connecting element
56 second end of connecting element
58 retaining element
60 mounting slot
62 engagement section 64 recess
66 detent element
68 raised portion
70 indentation
72 depression
74 detent section
76 hose barb
78 flange
80 blind plug

The invention claimed is:

1. A distributor assembly for a separation unit of a modular process device arrangement, comprising:
 a fluid distributor device having a housing, a working port accessible through an open side of the housing, and a plurality of fluid ports,
 the fluid distributor device in fluid communication with the separation unit via a connection between a fluid inlet or a fluid outlet of the separation unit and the working port, and
 the fluid distributor device being adapted to selectively establish and block fluid communications between the plurality of fluid ports and between the plurality of fluid ports and the working port,
 a connecting element, and
 a retaining element,
 wherein the connecting element is adapted to be attached to one of the fluid ports,
 wherein the distributor assembly includes an associated mounting slot at the one of the fluid ports, and
 wherein the mounting slot is adapted to a shape of the retaining element such that the retaining element is insertable into the mounting slot up to a defined retaining position, in which the retaining element engages the connecting element and fixes it in place, and
 wherein the connecting element is
 a connector having a flow duct which is defined by a wall and opens into two opposite open ends, wherein in a fixed state of the connector to the one of the fluid ports, one of the open ends of the connector is aligned with the one of the fluid ports, or
 a functional unit which, in a fixed state to the one of the fluid ports, is in fluid communication with the one of the fluid ports.

2. The distributor assembly according to claim 1, characterized in that the functional unit is integrated in a blind plug.

3. The distributor assembly according to claim 1, characterized in that the connecting element includes a septum.

4. The distributor assembly according to claim 1, characterized in that, in a fixed state of the connecting element, an engagement section of the retaining element engages in a recess of the connecting element.

5. The distributor assembly according to claim 4, characterized in that the engagement section and the recess are matched to each other such that the connecting element can be fixed in place by the retaining element only in a single orientation or in a limited number of defined orientations.

6. The distributor assembly according to claim 1, characterized in that a flange of the connecting element and an opening associated with a fluid port are matched to each other such that the connecting element is insertable into the opening only in a single orientation or in a limited number of defined orientations.

7. The distributor assembly according to claim 1, characterized in that the retaining element includes a detent element or a detent section which, in the retaining position of the retaining element, cooperates with a matching detent section or detent element in or on the mounting slot of the distributor assembly.

8. The distributor assembly according to claim 7, characterized in that the detent element is no longer detachable from the detent section when the retaining element is in the retaining position.

9. The distributor assembly according to claim 7, characterized in that the detent element and the detent section are matched to each other such that the retaining element is removable from the retaining position by deflecting the detent element or the detent section.

10. The distributor assembly according to claim 1, characterized in that the retaining element and the distributor assembly have complementary index structures that cooperate with each other such that insertion of the retaining element into the mounting slot in an incorrect orientation is prevented.

11. The distributor assembly according to claim 10, characterized in that the index structures include at least one raised portion and at least one depression adapted to the raised portion.

12. The distributor assembly according to claim 1, characterized in that the connecting element is sealed from the fluid port by at least two sealing rings.

13. The distributor assembly according to claim 1, wherein the connecting element is the functional unit, wherein the functional unit is one of a venting mechanism, sampling equipment, a sensor, or a spectroscopic measuring device.

14. The distributor assembly according to claim 13, wherein the functional unit is the sensor, wherein the sensor is a pressure, flow, viscosity, pH or electrical Conductivity sensor.

15. The distributor assembly according to claim 13, wherein the functional unit is the spectroscopic measuring device, wherein the spectroscopic measuring device is a UV-VIS, NIR, or Raman spectroscopic measuring device.

16. The distributor assembly according to claim 1, wherein the fluid distributor device is fixed in place on a bottom or a cover section of the separation unit.

* * * * *